Jan. 4, 1927.
C. S. SMITH
1,613,592
REAR AXLE HOUSING AND GEAR CASING FOR AUTOMOBILES
AND METHOD OF MANUFACTURING THE SAME
Filed June 14, 1922
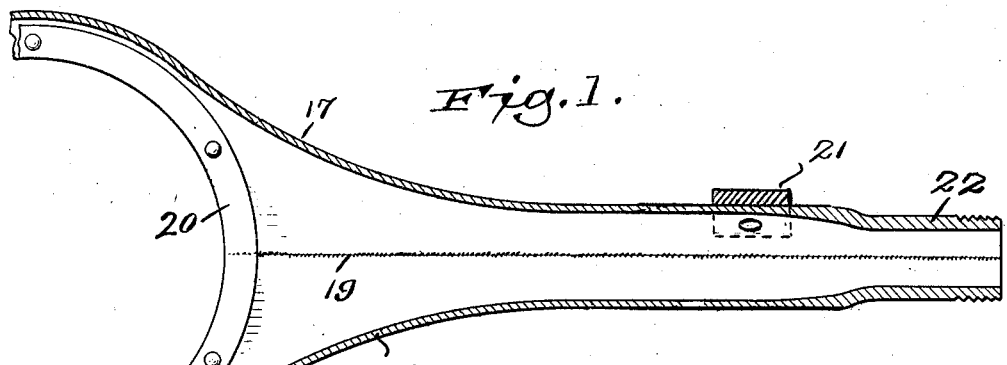
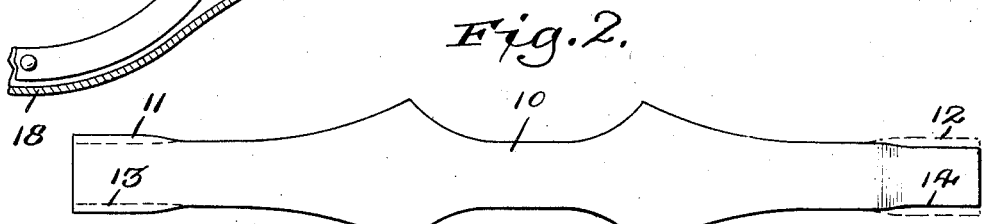
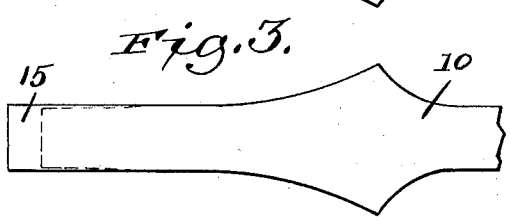
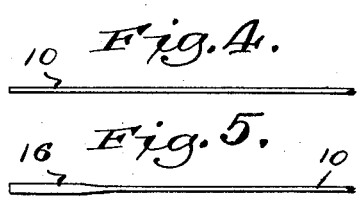
INVENTOR.
C. S. Smith,
BY
Erwin, Wheeler & Woodard
ATTORNEYS.
WITNESS:
Fred Palm
Del.

Patented Jan. 4, 1927.

1,613,592

UNITED STATES PATENT OFFICE.

CHARLES S. SMITH, OF MILWAUKEE, WISCONSIN, ASSIGNOR TO A. O. SMITH CORPORATION, OF MILWAUKEE, WISCONSIN, A CORPORATION OF NEW YORK.

REAR-AXLE HOUSING AND GEAR CASING FOR AUTOMOBILES AND METHOD OF MANUFACTURING THE SAME.

Application filed June 14, 1922. Serial No. 568,296.

My invention relates to the rear axle housing and differential gear casing for a motor vehicle.

It comprises also an improvement in the methods of manufacturing such axle housings and gear casings. In producing axle housings and gear casings of the type mentioned, it is the usual practice to form two half shell members, and to weld them along their meeting edges so as to form a unitary and permanent structure.

By reason of the dimensions of the axle housing and gear casing, which will be hereinafter referred to as the axle housing for convenience, it is desirable to shape the same from sheet metal of comparatively thin gauge, in order that excess of weight may be avoided. But in order to enable the light weight axle housing to be machined, it is the customary practice to insert in each of the opposite sleeved ends of the housing a short tubular lining member of increased gauge, so that such tubular member will constitute an additional body necessary to enable the ends of the housing to be machined without impairing the strength or serviceability thereof.

The operations which are incident to the production and insertion of the tubular lining members in the sleeves of the housing, and securely fastening them in position as a part of the housing, are numerous and expensive. But this method of construction is necessarily followed in order that the completed housing may possess the very desirable feature of lightness in weight, and at the same time be endowed with the requisite strength, the latter being achieved through the reinforcement of the housing which results from the employment of the tubular lining member of thicker gauge.

It is the purpose of my invention to facilitate the production of axle housings by the elimination of some of the expensive operations referred to as attendant upon the production of housings of the older form. I achieve this very desirable result by forming the housing from half shell members as usual, but in the progress of the operations whereby the housing is manufactured, I produce an integral reinforcement or thickening of the stock from which the housing is formed, in such manner as to provide an integral reinforcement in the regions subjected to the greatest stresses, so that the housing may be subjected to the necessary machining operations without weakening the structure thereof.

My preferred method of achieving this result is accomplished preferably by an edgewise compression of the ends of the blanks used in producing the housing. I then draw or press the half shell members into shape and unite them along their meeting edges by welding as before. As a result of this procedure, I am enabled to produce an axle housing from thin gauge sheet metal, but integrally reinforced in those portions which are to be subjected to machining operations. Such a housing possesses the necessary degree of strength to enable it to resist any strains to which it may be subjected, and it is lighter in weight than a housing produced by the older method of manufacture. The integral reinforcement of the end section of the housing may be effected by compressing the ends of the blank laterally of the same, or by compressing the ends of the blank in the direction of the length of the same, either manner of compression effecting a thickening of the material transversely of the plane of the blank.

The tubular ends of the integrally formed housing thus produced, may be threaded internally or externally as required, and otherwise machined, without impairing its strength.

My invention resides in a pressed sheet metal rear axle housing for an automobile, of general tubular form and is provided with an enlarged central section from which extends opposite arms, each arm having the gauge of the metal at the end thereof increased so as to permit the opposite ends of the housing to be machined without weakening the structure, as will hereinafter be described and claimed.

In the accompanying drawings:

Fig. 1 is a vertical sectional view through one end of a housing, constructed in accordance with my invention, and showing the integral reinforcement of the same.

Fig. 2 is a diagrammatic plan view showing the manner in which the integral reinforcement is effected by lateral compression of the ends of the blank to reduce the same to the desired width, and at the same time effect the desired thickening of the metal thereof.

Fig. 3 is a plan view of one end of a blank, in which the integral reinforcement referred to is effected by an endwise compression, applied to the blank so as to produce a thickening of the stock in the ends thereof.

Fig. 4 is a conventional edge view of one end of a blank before being subjected to either of the operations described in connection with Figs. 2 and 3.

Fig. 5 is a similar view of the blank after compression of the ends thereof.

Referring to the drawing, Fig. 1 shows in vertical section one end of an improved axle housing and differential gear casing constructed in accordance with my invention. In the manufacture of such housing, blanks 10 of proper contour are punched from sheet metal of uniform gauge. Fig. 2 illustrates generally the contour of one of such blanks, but showing also certain variations in the outline of the blank produced by subjecting it to the operations necessary to conform the blank to the purposes of my invention. The blanks 10 will be produced with both ends formed in the manner indicated by the full lines 11 at the left of Fig. 2, and by the dotted lines 12 at the right. That is, the extreme end sections may be slightly wider, so as to provide sufficient material to form the desired increase in the gauge of the metal, if necessary; but the width of such ends is not material, and will be varied to meet particular conditions. The ends of the blanks are then subjected to a swaging or upsetting operation, applied in the plane in which the blank extends, and by means of which their width is reduced as indicated by dotted lines 13 at the left of Fig. 2 and by the full lines 14 at the right thereof. The swaging operation or edgewise compression of the ends of the blank increases the gauge and produces an integral thicker formation of the stock in the extreme ends, which will constitute a reinforcement of the metal at such points.

The same integral thickening of the ends of the metal at the ends of the blank may be effected by an endwise compression of the metal at the ends of the blank as indicated at 15 in Fig. 3, such endwise compression serving to integrally increase the gauge of the stock in the ends of the blank as before, for the purpose of my invention. Fig. 4 shows an edge view of a section of the blank 10, it being understood that the latter is of uniform gauge. Fig. 5 shows a like view of the blank 10, after the same has been subjected to either of the compressing operations, so as to produce an integral thickening of the ends of the blank, as indicated at 16

Upon receiving the treatment described, the blanks 10 of uniform gauge but with their ends integrally thickened, are subjected to a drawing operation by means of which they are converted into half-shell members 17 of well known form. When two of such half-shell members are assembled with their edges in alignment, the structure of housing shown in Fig. 1 is produced, such housing comprising an enlarged central portion 18, constituting a gear casing. The edges of the half-shell members are welded along their meeting lines as at 19, to constitute an integral structure. The casing about the through opening is reinforced upon each inner side, by a ring 20, which ring may be riveted or spot-welded in the position shown, to provide a better anchorage for the parts which are attached to the casing. The welded joints 19 which connect the half-shell members into an integral structure are preferably made on opposite sides of the housing in the horizontal axial plane or neutral axis of the latter, and as so located such welded joints are subjected to but little strain in the operation of the automobile in which the axle housing is incorporated as a part.

Springs seats 21 may be secured to the housing near its opposite ends, by any suitable means.

It will be noted that the extreme, opposite ends of the housing are by my invention provided with an integral thickening of the gauge of the sheet metal of which the housing is formed, as indicated at 22 in Fig. 1. This integral thickening of the gauge of the metal provides an increase in stock which will enable the housing to be machined without weakening the structure thereof, and at the same time effect a decrease in the weight of the part by omission of the separate parts heretofore used in like structures. As shown in Fig. 1, the housing tapers towards its ends from the enlarged central portion or gear casing 18. The reduction in the diameter of the ends of the housing, as shown, is merely incidental to a housing constructed for use in an automobile of a particular make.

I am aware that heretofore axle housings of pressed sheet metal have been produced by reducing the gauge of a blank between its ends so as to leave such ends of the original gauge of the metal, and so constitute a re-inforcement. But such prior practice does not reach my invention, in that the uniform gauge of the sheet metal from which the half-shell members is formed is destroyed. It results that by my invention, production is more economical and expeditious, by reason of the simplicity of the operations followed in making the article.

The axle housing with the integral reinforcement in the ends may also be produced by constructing the housing from sheet metal blanks of uniform gauge, and thereafter swaging the ends of the welded housing by the application of converging pressures, the latter being so directed as to reduce the diameter of such ends and at the same time increase the thickness of the stock thereof to the desired extent, as shown in Fig. 1.

The provision of the integrally reinforced ends of the housing adds greatly to the rigidity of the structure, and enables such ends to resist in the most complete manner any crushing strains encountered in the machining operations. In the welding operation, the most satisfactory results are obtained by the use of a fusible weldrod.

My invention greatly simplifies the operations performed in the manufacture of the axle housing, and effects a material reduction in its weight, without lessening its strength in any respect, and is economically produced. In these particulars, it is advantageous over the prior structures.

Having thus described my invention, what I claim and desire to secure by Letters Patent of the United States, is:

1. A light-weight axle housing of single thickness composed of two complemental pressed sheet metal half-shell members of uniform gauge welded along their meeting edges in the line of the neutral axis of the housing to constitute an integral structure, the said housing comprising an enlarged central portion provided with a transverse through opening and tapering tubular ends integral with and extending oppositely from the central portion, the gauge of the metal in the extremities being integrally increased to permit machining of the ends without weakening the structure of the housing.

2. A light-weight axle housing of single thickness for automobiles, composed of two complemental pressed sheet metal half-shell members of uniform gauge welded along their meeting edges to constitute an integral structure, the said housing comprising an enlarged central portion forming a gear casing and tapering tubular ends extending oppositely from the central portion, the metal in the opposite ends of the housing being integrally thickened to permit machining as described without weakening the structure of the housing.

3. A light-weight axle housing of single thickness for automobiles, composed of two complemental pressed sheet half-shell members of uniform gauge welded along their meeting edges to constitute an integral structure, the said housing comprising an enlarged central portion forming a gear casing and tapering tubular ends extending opposite from the central portion, the metal in the opposite ends of the housing being integrally thickened to permit machining as described without weakening the structure of the housing.

4. The method of making axle housings, which comprises the steps of cutting contoured blanks from a metal sheet of uniform gauge, compressing the metal in the opposite ends of the blanks in the plane in which the blank extends to increase the gauge of the metal in such ends, drawing the blanks into shape as half-shells, assembling the latter with their edges in engagement, and then welding the half-shells together along the lines of their meeting edges to constitute an integral structure.

5. The method of making axle housings, which comprises the steps of cutting contoured blanks from a metal sheet of uniform gauge, compressing the opposite ends of such blanks in the plane in which the blank extends to create an integral thickening of the metal in such ends, drawing the blanks into shape as half-shells, assembling them with their edges in engagement, welding the half-shells together along the lines of their meeting edges to constitute an integral structure, and machining the said ends.

6. The method of making axle housings, which comprises the operations of upsetting the ends of metal blanks of uniform gauge to increase the thickness of the metal in such ends, drawing the blanks into shape as complemental members, assembling the complemental members, and welding them together along the lines of their meeting edges, whereby an integral structure with ends of thickened gauge for machining is produced.

7. The method of making axle housings, which comprises the steps of upsetting the ends of metal blanks of uniform gauge to increase the thickness of the metal in such ends, drawing the blanks into the form of half-shell members, and uniting the said members along the lines of their meeting edges, whereby a metal housing with opposite ends of thickened gauge for machining is produced.

In testimony whereof, I have signed my name at Milwaukee, this 5th day of June, 1922.

C. S. SMITH.